May 31, 1960   J. R. KERSH   2,938,638
SHIP ELEVATOR
Filed Dec. 3, 1957   3 Sheets-Sheet 1
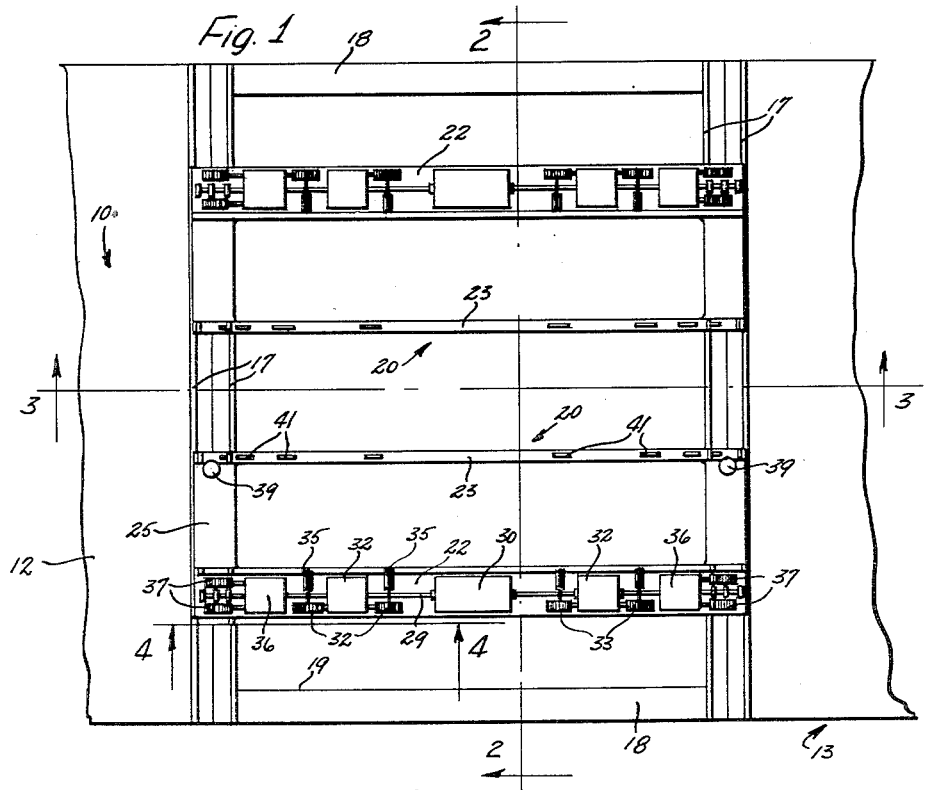
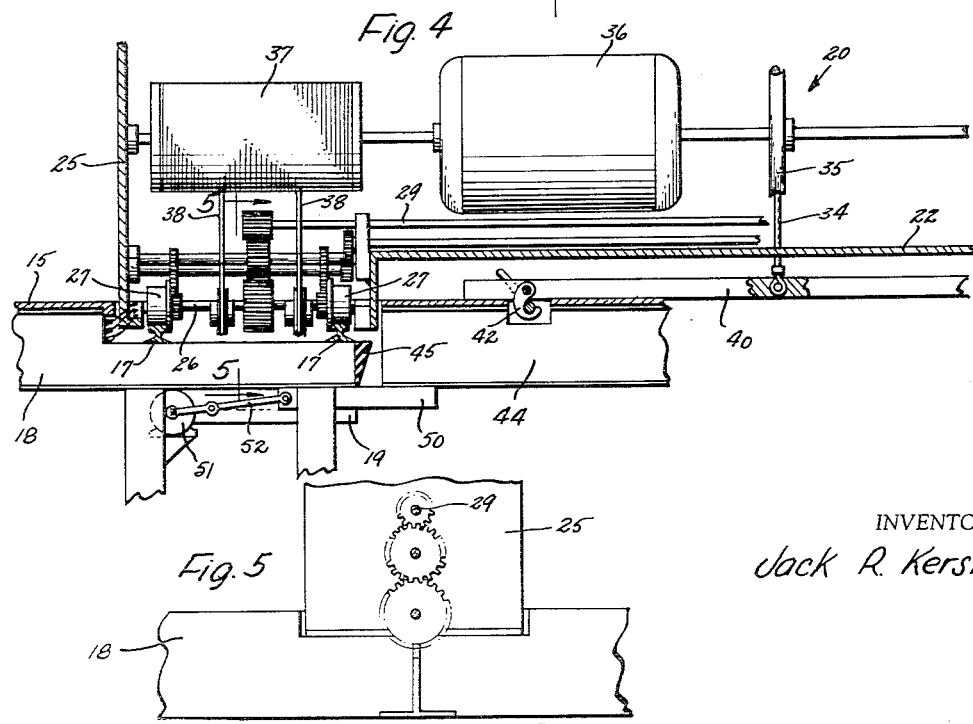
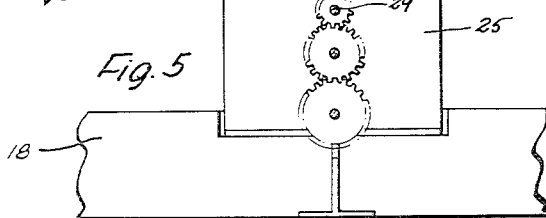
INVENTOR
Jack R. Kersh May 31, 1960     J. R. KERSH     2,938,638
SHIP ELEVATOR
Filed Dec. 3, 1957     3 Sheets-Sheet 2
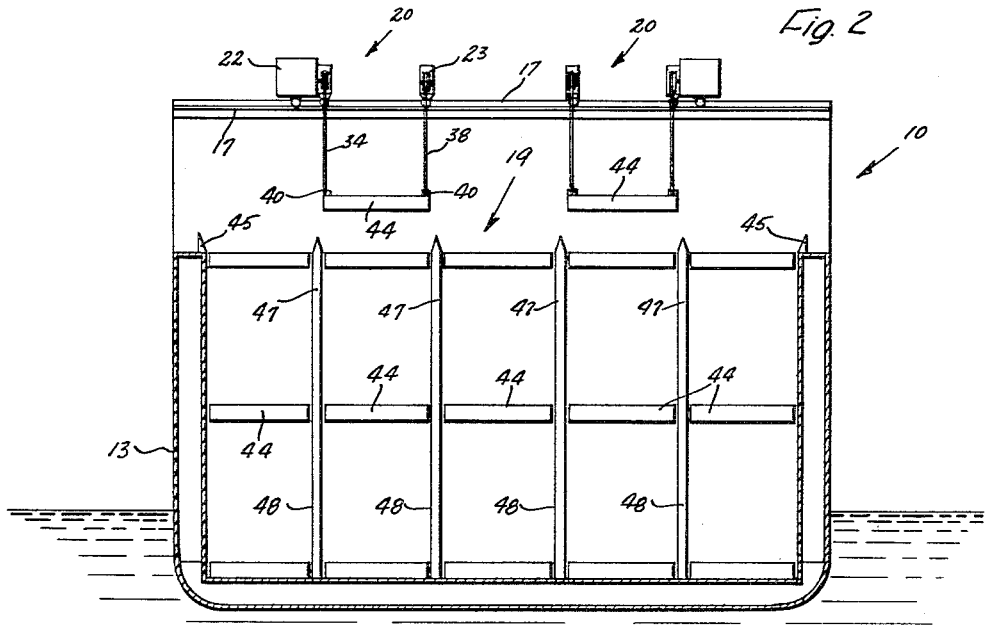
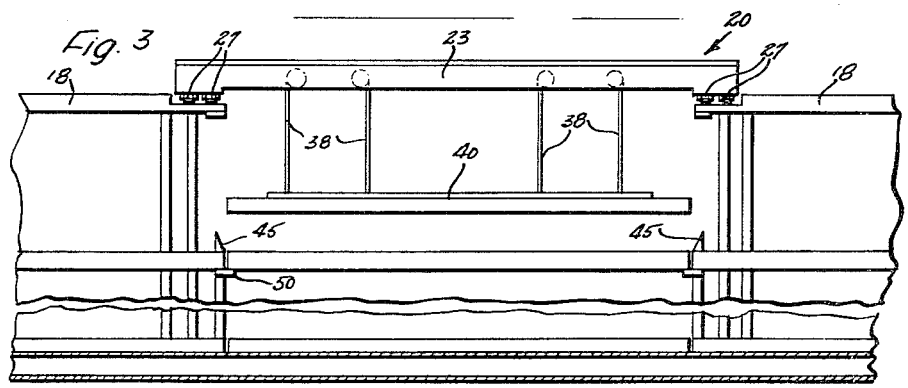
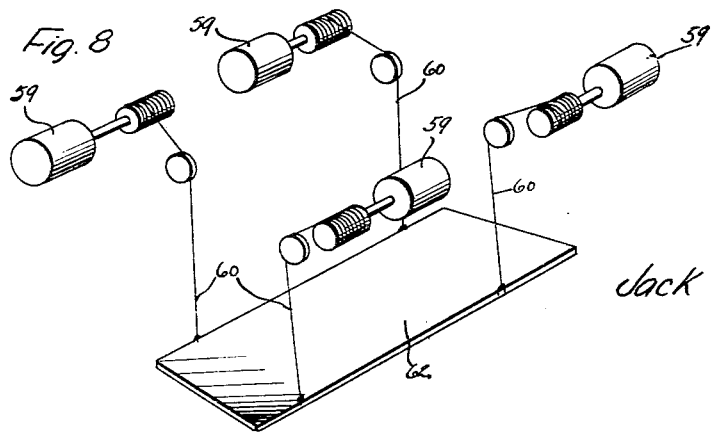
INVENTOR
Jack R. Kersh May 31, 1960

J. R. KERSH 2,938,638

SHIP ELEVATOR

Filed Dec. 3, 1957

INVENTOR

Jack R. Kersh

United States Patent Office
2,938,638
Patented May 31, 1960

2,938,638

SHIP ELEVATOR

Jack R. Kersh, 1906 15th Ave. N., Texas City, Tex.

Filed Dec. 3, 1957, Ser. No. 700,384

1 Claim. (Cl. 214—15)

This invention relates to cargo handling apparatus and more particularly to apparatus for loading and unloading ship cargo.

It is an object of the present invention to provide a novel cargo hold arrangement for cargo ships and cargo elevator apparatus for facilitating a loading and unloading of cargo into and out of such cargo hold with a minimum amount of effort and in a minimum amount of time.

Another object of the present invention is to provide cargo handling apparatus which is equally applicable to roll on/off and lift on/off cargo handling methods.

Still another object of the present invention is to provide cargo handling apparatus of the above type in which the ship elevator carriage may be extended beyond the sides of the ship and over the water or dock so as to enable cargo to be lifted vertically to the carriage and then transversely across the ship to the proper position within the cargo hold.

Still another object of the present invention is to provide cargo handling means of the above type in which cargo deck platforms are used as an integral part of the hold of the ship for supporting cargo therewithin and are used to transport the cargo from the ship to the dock directly.

Another object of the present invention is to provide cargo handling apparatus which may be provided with a pair of identical carriages so as to enable the ship to be loaded or unloaded from both sides simultaneously.

Other objects of the invention are to provide a ship cargo apparatus bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a fragmentary top plan view of a ship embodying cargo handling apparatus made in accordance with one form of the present invention;

Figure 2 is a transverse cross sectional view taken along line 2—2 of Figure 1;

Figure 3 is a longitudinal cross sectional view taken along line 3—3 of Figure 1;

Figure 4 is an enlarged fragmentary cross sectional view taken along line 4—4 of Figure 1;

Figure 5 is a fragmentary transverse cross sectional view taken along line 5—5 of Figure 4;

Figure 8 is a fragmentary perspective diagrammatic view illustrating the manner of operation of the apparatus shown in Figures 6 and 7.

Figure 6:
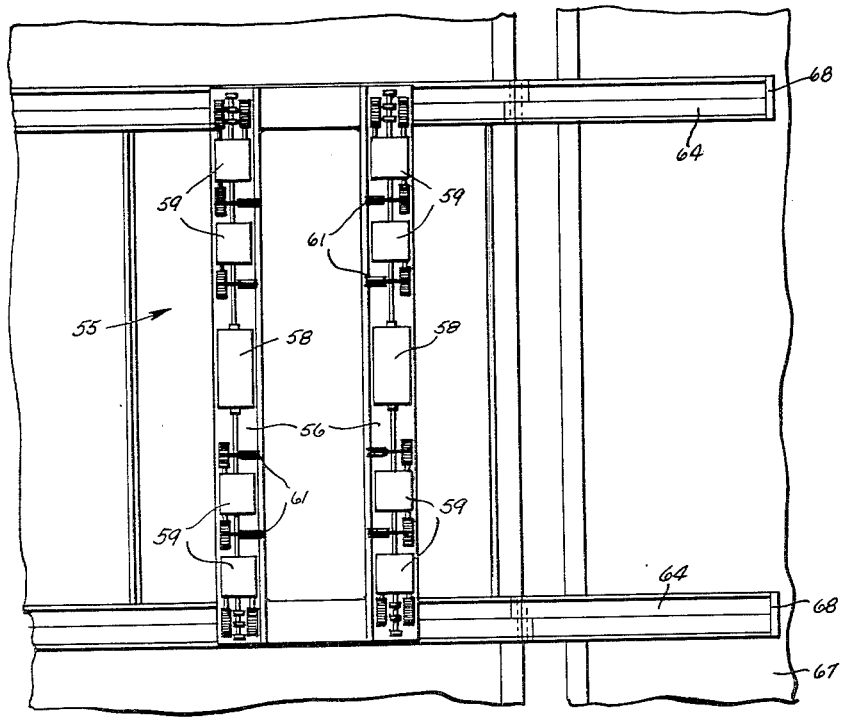
Figure 6 is a view similar to Figure 1, showing a modified form of construction made in accordance with a preferred embodiment of the present invention.

Referring now more in detail to the drawing, and more particularly to Figures 1 to 5 thereof, cargo handling apparatus 10 made in accordance with one form of the present invention is shown to be in operative association with the deck 12 of a conventional or specially built cargo ship 13. As is more clearly shown in Figure 4 of the drawing, portions of the deck plate 15 and longitudinal beams 18 are cut away in the vicinity of the cargo hold 19 to provide a support for spaced sets of transversely extending rails 17 which provide guide and support means for the cargo handling carriages 20.

In the embodiment disclosed in Figures 1 to 6 of the drawing, the apparatus includes a pair of identical carriages 20, each such carriage being constructed of a main beam 22, an auxiliary beam 23, and a pair of spaced parallel end pieces 25 which secure the main and auxiliary beams together in spaced parallel relationship. These end pieces 25 also support axles 26 to which flanged wheels 27 are secured for rollably supporting each such carriage 20 for reciprocating movement transversely of the ship upon the transversely extending rails 17. The main beam 22 of each such carriage 20 supports a main driving motor 30 having drive shafts 29 extending outwardly from each end thereof into driving engagement with the wheels 27, through suitable gearing, as illustrated in Figure 4. The main beam 22 of each carriage also supports hoist motors 32 and which control the rotation of cable rope drums 33 for directing and supplying wire rope 34 over guide sheaves 35 that are associated with the main beam 22 of the carriage. The main beam 22 also supports auxiliary motors 36 which are drivingly connected to drums 37 which control the movement of wire rope 38 over auxiliary guide sheaves 39 associated with the auxiliary beam 23 so as to raise and lower the wire rope 38 relative to the sheaves 41 carried by the auxiliary beam 23 simultaneously with the movement of the wire rope 34 relative to the guide sheaves 35 of the main beam 22. The free end of each of the wire ropes is directly connected to spaced apart points of a deck platform lifting bar 40 which moves vertically relative to each one of the main and auxiliary beams. These lifting bars 40 are, in turn, detachably connected to opposite sides of a deck platform 44, such as by manually releasable latch devices 42.

In actual use, these deck platforms 44 are loaded into or removed from the holds of the ship, in the manner shown in Figure 2. Resilient bumpers 45 surround the opening of the hold so as to guide the platforms for movement relative thereto into association with deck platform guides 47 which extend vertically upwardly from vertical columns 48 that divide the hold into predetermined compartments for receiving these platforms. As is more clearly shown in Figures 3 and 4 of the drawing, each level of the hold is provided with sets of deck platform supports 50 which are supported for reciprocating movement between an extended deck platform supporting position and a retracted released position in response to energization of an associated motor 51 which drives such supports 50 through an eccentric throw link assembly 52. Thus, these supports 50 are moved to the extended position shown as a deck platform 44 is lowered into position so as to support such platform in the pre-arranged stacked relationship as shown in the drawing, in proper spaced relationship with the next lower and next higher deck platform associated therewith. In a similar manner, as each deck platform is raised out of the hold, the associated supports 50 are retracted so as to enable the next lower deck platform to be raised vertically through the hold toward the unloading position.

Figure 7:
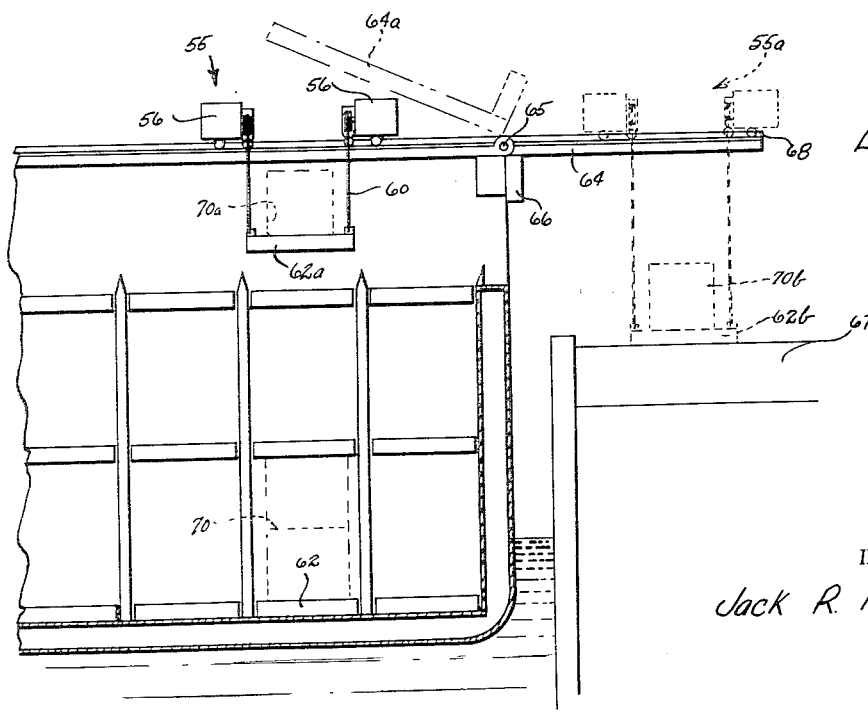
Figure 7 is a transverse cross sectional view of the apparatus shown in Figure 6.

In the aforementioned embodiment of the present invention, the two identical carriages 20 may be used to simultaneously load or unload the ship from both sides thereof. With reference to Figures 6, 7, and 8 of the drawing, a modified form of construction is shown which requires the use of a single modified form of carriage 55 which is singly mounted upon the rails of the ship. This carriage 55 includes a pair of identical main beams 56, each of which supports a main drive motor 58 for driving the wheels of the carriage along the provided rails. Each such main beam 56 is also provided with a plurality of cable lift motors 59 which control the movement of the wire rope 60 with the guide sheaves 61 for raising and lowering the associated deck platforms 62. In this arrangement, each side of the ship is provided with rail extension units 64 which are rotatably connected to the ends of the main rails for movement about connecting pivots 65 between an extended operative position and a retracted inoperative position. Perpendicularly extending abutment arms 66 engage the outer sides of the ship when the extension units are in the operative position shown in Figure 7.

In using this preferred form of the present invention, the rail extension units 64 are rotated to the operative position, in which they overlie the water or the conventional dock structure 67. Outer limit stops 68 prevent the accidental disengagement of the carriage with the rails at the outer ends of these extension units.

In actual use, the rail extension unit is rotated from the inoperative position 64a to the extended position 64 illustrated in the drawing. Cargo 70 which may be supported upon a deck platform 62 within the hold of the ship may then be raised by the lift motors 59 of the carriage 55 by connecting the free ends of the rope cables 60 to the deck platform 62. After the deck platform 62 has been raised vertically to a position 62a above the hold, the drive motors 58 of the carriage may be used to propel the carriage to a point 55a over the dock 67, from which point the lift motors 59 may be reversed to lower the elevated deck platform 62a to the lowered position 62b, from which point the cargo 70b may then be unloaded. If desired, the roll on/off method may be used merely by retaining the inoperative rail extension unit 64a in the broken line position shown in the drawing and by providing suitable ramps between the dock or shore or the upper deck of the ship.

While various changes may be made in the detail construction, it shall be understood that such changes shall be within the spirit and scope of the present invention as defined by the appended claim.

What I claim as new and desire to protect by Letters Patent of the United States is:

A cargo ship comprising a deck having a cargo hold and longitudinally-extending beams cut away from the deck surface within the cargo hold and extending thereinto from the fore and aft sides thereof, pairs of transversely-extending rails supported on the cut away ends of said beams, a longitudinally-extending carriage spanning the cargo hold and having wheels at the opposite ends thereof respectively rollably supported on the respective pairs of rails, said carriage having a main beam, an auxiliary beam and end pieces securing the main and auxiliary beams together in spaced parallel relationship, a main driving motor supported on the main beam and having a drive shaft extending outwardly from each end thereof and drivingly connected to the wheels, hoist motors and cable drums carried by the main beam, transversely-spaced lifting bars running longitudinally of the cargo hold under the elevator carriage, said main beam having sheave pulleys with their axes running parallel to the main beam and cables extending over the sheave pulleys and connected to one of the lifting bars, said hoist motors and cable drums serving to operate said cables, other hoist motors and cable drums supported respectively on the ends of the main beam, sheave pulleys on the main beam under the cable drums, pulleys on the auxiliary beam at the respective opposite ends thereof and rotatable about vertical axes and other pulleys on the auxiliary beam intermediate thereof and rotatable transversely-extending axes, cables extending from these other hoist motors and drums on the main beam over the under pulleys of the main beam, the vertical pulleys of the auxiliary beam, the intermediate pulleys of the auxiliary beam and connected to the other lifting bar, a deck elevator platform and latch devices for releasably connecting the lifting bars to the deck platform, vertically-extending deck platform guides in the cargo hold for guiding the vertical movement of the deck platform, and retractible platform supports disposed adjacent the longitudinal beam ends and engageable with the deck platform to hold the platform in an elevated position independently of the lifting bars.

References Cited in the file of this patent
UNITED STATES PATENTS

| | | |
|---|---|---|
| 1,591,278 | Brush | July 6, 1926 |
| 2,063,914 | Fitch | Dec. 15, 1936 |
| 2,247,145 | Baldwin | June 24, 1941 |
| 2,541,893 | Speer | Feb. 13, 1951 |